United States Patent
Koyanagi

(10) Patent No.: US 6,816,960 B2
(45) Date of Patent: Nov. 9, 2004

(54) CACHE CONSISTENT CONTROL OF SUBSEQUENT OVERLAPPING MEMORY ACCESS DURING SPECIFIED VECTOR SCATTER INSTRUCTION EXECUTION

(75) Inventor: Hisao Koyanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 554 days.

(21) Appl. No.: 09/901,060

(22) Filed: Jul. 10, 2001

(65) Prior Publication Data

US 2002/0007449 A1 Jan. 17, 2002

(30) Foreign Application Priority Data

Jul. 12, 2000 (JP) .......................................... 2000-211607

(51) Int. Cl.[7] .............................................. G06F 9/312
(52) U.S. Cl. ............................... 712/4; 711/144; 712/6; 712/216; 712/225
(58) Field of Search ............................... 712/3, 6, 216, 712/225, 4; 711/144

(56) References Cited

U.S. PATENT DOCUMENTS 5,241,633 A * 8/1993 Nishi .......................... 712/216
5,247,635 A * 9/1993 Kamiya ........................ 711/3
5,895,501 A    4/1999 Smith ......................... 711/207

FOREIGN PATENT DOCUMENTS

| EP | 0 305 639 A2 | 3/1989 |
|---|---|---|
| EP | 0 600 703 A2 | 6/1994 |
| JP | 57-193842 A | 11/1982 |
| WO | WO 00/27050 A1 | 5/2000 |
| WO | WO 00/33177 A1 | 6/2000 |

* cited by examiner

Primary Examiner—Kenneth S. Kim
(74) Attorney, Agent, or Firm—Sughrue Mion, PLLC

(57) ABSTRACT

A vector artchitecture processing unit according to the present invention comprises a vector scatter (VSC) address coincidence detection unit 3 that comprises registers in which an area start address and an area end address of an area specified by an area-specified vector scatter instruction are stored; and a circuit that checks if the addresses specified by the area-specified vector scatter instruction overlap with an address to be accessed by a memory access instruction following the area-specified vector scatter instruction, wherein an instruction issue control unit 1 comprises a hold control circuit that holds the following memory access instruction in response to an address conflict signal from the VSC address conflict detector.

10 Claims, 8 Drawing Sheets

FIG. 7

|  | X | Y | Z |
|---|---|---|---|
| LDS INSTRUCTION | OPC | Rx | Ry | Rn |

$Rx \leftarrow M(Ry + Rz)$

CACHE CONSISTENT CONTROL OF SUBSEQUENT OVERLAPPING MEMORY ACCESS DURING SPECIFIED VECTOR SCATTER INSTRUCTION EXECUTION

FIELD OF THE INVENTION

The present invention relates to a vector architecture information processing equipment, and more particularly to a vector scatter instruction control circuit.

BACKGROUND OF THE INVENTION

On a vector architecture information processing equipment, memory area data accessed by a vector instruction is not usually entered in a cache.

The reason is that locality of reference generally does not well applies to data access by a vector instruction so that data accessed by a vector instruction, if entered in a cache memory, is swapped out immediately by other cache line data, and a cache hit ratio decreases.

Also, on a vector architecture information processing equipment, there are provided some vector based memory access instructions, such as VST (vector store)/VLD (vector load) instruction in which a memory access address is defined by a start address and a distance of a vector data to be accessed.

VLD instruction loads data from memory into a vector data storage area made of a plurality of words arranged in a vector unit, called "vector register" in accordance with memory access address defined as described above.

Conversely, VST instruction stores data from a register into memory.

In case of VST instruction, an address accessed by the instruction may be determined on an instruction issue stage. It is relatively easy to accomplish an improvement of performance, by controlling such an instruction as VLD instruction or scalar load instruction that follows VST instruction to be executed ahead of the VST instruction.

On the other hand, with so-called "list vector" instructions, such as VGT (vector gather)/VSC (vector scatter) instructions, data stored in vector registers arranged in the vector unit is used as a memory address to be accessed so that the memory address to be accessed is identified only after the instruction gets to the vector unit, whereas the address is generally random.

For the sake of better understanding of the present invention, a list vector instruction will be described with reference to FIG. 8.

First, as shown in FIG. 8(a), VGT (vector gather) instruction loads data from memory in such a way that a memory data at an address VA (n) of a vector register Vy, is loaded into a corresponding element of the vector register Vx.

As shown in FIG. 8(b), VSC (vector scatter) instruction stores data into memory in such a way that data of the vector register Vx is stored into a memory area of which address VA (n) is stored in a corresponding element of the vector register Vy.

In contrast to vector memory access instructions, with a scalar memory access instruction, locality of reference generally applies to data accesses, as a result of which, such a system is usually adopted in which data accessed by the scalar memory access instruction is stored in a cache memory to make memory access latency being hidden.

SUMMARY OF THE INVENTION

When a vector memory access instruction is issued to write data into memory on a vector architecture information processing equipment accommodated with a cache as described in the above, it is necessary to execute cache invalidation to ensure cache consistency in case that an address to be accessed is being entered in the cache, wherein the cache invalidation process generates a stall of a cache access instruction that follows the vector memory access instruction, which is a one of primary causes of degradation of performance.

A cache invalidation process differs between VST (vector store) instruction and VSC (vector scatter) instruction.

In case of VST instruction, a start address and a distance are determined when the instruction is issued so that with these two data relatively high-speed cache invalidation is realized. Furthermore, since memory access start address and end address of VST instruction can be calculated promptly, a scalar LD (load) instruction that follows VST instruction, may be controlled to be executed ahead of the VST instruction if no address coincidence is detected between these two instructions.

On the other hand, in case of VSC (vector scatter) instruction, since an address to be accessed is determined only after the address is read from a vector register and, in addition, the address value is random, it is necessary to send an invalidation address from a vector unit to a cache invalidation control unit (see 4 in FIG. 1) in a scalar unit to invalidate cache data that matches the invalidation address.

As a result, all memory access instructions that follow VSC instruction cannot be issued until this cache invalidation processing is completed. This causes degradation of performance.

This problem will be described more in detail with reference to FIGS. 6 and 7.

First, in order to make description easy to understand, LDS instruction, which belongs to scalar load (cache access) instructions, will be described with reference to FIG. 7. As with VGT/VSC instruction, LDS instruction comprises four fields: OPC (operation code) and operands X, Y, and Z wherein a memory access address is calculated as Ry+Rz and a resultant data M (Ry+Rz) that is read from memory area of an address Ry+Rz is stored into register Rx.

In FIG. 6(a), after VST (vector) instruction is issued, the cache is invalidated and, almost at the same time, data is written from the vector into memory.

The LDS instruction following the VST instruction may be issued even with the cache being invalidated, unless access address of the LDS instruction overlaps with that of the VST instruction.

On the other hand, referring to FIG. 6(b), with VSC (vector scatter) instruction, cache invalidation is performed when vector processing starts and an invalidating address is sent. In addition, since an address to be accessed immediately after VSC instruction is issued is not known and an address is random, LDS instruction that follows the VSC instruction is kept waiting in a hold state until cache invalidation is completed.

As described above, all memory access instructions that follow the VSC instruction cannot be issued before cache invalidation is completed and this causes performance degradation.

In view of the foregoing, it is an object of the present invention to provide a vector architecture processing equipment that prevents a following instruction from being delayed because of cache invalidation of a vector scatter instruction and that executes the following instruction before the vector scatter instruction to improve performance.

To achieve the above object, in accordance with one aspect of the present invention is provided a circuit comprising:

means for detecting whether an overlap exists between an address to be accessed by an area-specified vector scatter instruction, which specifies a range of memory access address, and an address to be accessed by a memory access instruction that follows the area-specified vector scatter instruction; and means for holding the memory access instruction that follows on which address coincidence is detected.

In accordance with one aspect of the present invention is provided a circuit for controlling vector scatter instruction wherein an area-specified vector scatter instruction specifying scattered areas is provided as an instruction set, comprising:

an address coincidence detection unit detecting if an address to be accessed by the area-specified vector scatter instruction overlaps with an address to be accessed by a memory access instruction that follows the vector scatter instruction; and a hold control unit holding the memory access instruction that follows the vector scatter instruction if the addresses overlap.

In accordance with another aspect, is provided a vector architecture information processing equipment comprising:

a vector scatter address coincidence detection unit including:

registers for storing an area start address and an area end address of an area-specified vector scatter instruction in which the area start address and the area end address are specified; and a circuit for checking if an address to be accessed by a memory access instruction following the area-specified vector scatter instruction is within a scatter area defined by the area start address and the area end address specified by the area-specified vector scatter instruction to outputs an address conflict signal if the address to be accessed by the following memory access instruction is within the scatter area, wherein an instruction issue control unit comprises a hold control circuit for holding said following memory access instruction upon receipt of an address coincidence signal emitted from said vector scatter address coincidence detection unit.

In accordance with another aspect, the present invention provides a vector architecture information processing equipment comprising:

an instruction issue control unit decoding an instruction data to direct an instruction operation;

a cache control unit receiving an address from said instruction issue control unit to control a cache;

a vector unit, on receipt of an execution directive when a vector instruction is issued from said instruction issue control unit sending write vector data to a memory and sending a cache invalidation address, if the vector instruction is an area-specified vector scatter instruction specifying an area start address and an area end address of a scatter area;

a cache invalidation control unit receiving the cache invalidation address from said vector unit to invalidate the cache; and a vector scatter address conflict detection unit, on receipt of the area start address and the area end address of the area-specified vector scatter instruction from a register block accessed by said instruction issue control unit when the area-specified vector scatter instruction is issued from said instruction issue control unit, detecting if an area specified by the area start address and the area end address overlaps with an address area to be accessed by a memory access instruction following the area-specified vector scatter instruction to activate an address coincidence signal for sending said signal to said instruction issue control unit if an address overlap is detected, wherein said instruction issue control unit comprises a hold control circuit that holds the following memory access instruction in response to the activated address conflict signal from said vector scatter address conflict detector.

The hold control circuit preferably does not hold the following memory access instruction if the address coincidence signal from said vector scatter address coincidence detection unit is inactive. The hold control circuit holds the following memory access instruction until a cache invalidation end notification is received from said cache invalidation control unit.

The vector scatter address coincidence detection unit preferably comprises:

a first comparator that compares the address to be accessed by the following memory access instruction with the area start address specified by the area-specified vector scatter instruction and, if the address to be accessed by the following memory access instruction is equal to or larger than the area start address, outputs an active signal;

a second comparator that compares the address to be accessed by the following memory access instruction with the area end address specified by the area-specified vector scatter instruction and, if the address to be accessed by the following memory access instruction is equal to or smaller than the area end address, outputs an active signal; and a logical circuit that activates the address conflict signal and outputs the signal if both output signals from said first comparator and the output from said second comparator are active.

In an operand of the area-specified vector scatter instruction is included a predetermined field for specifying two registers in which the scatter area start address and the scatter area end address are respectively specified, said two registers being included in said register block.

Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is a diagram showing a processing of LDS instruction.

PREFERRED EMBODIMENTS OF THE INVENTION

Figure 1:
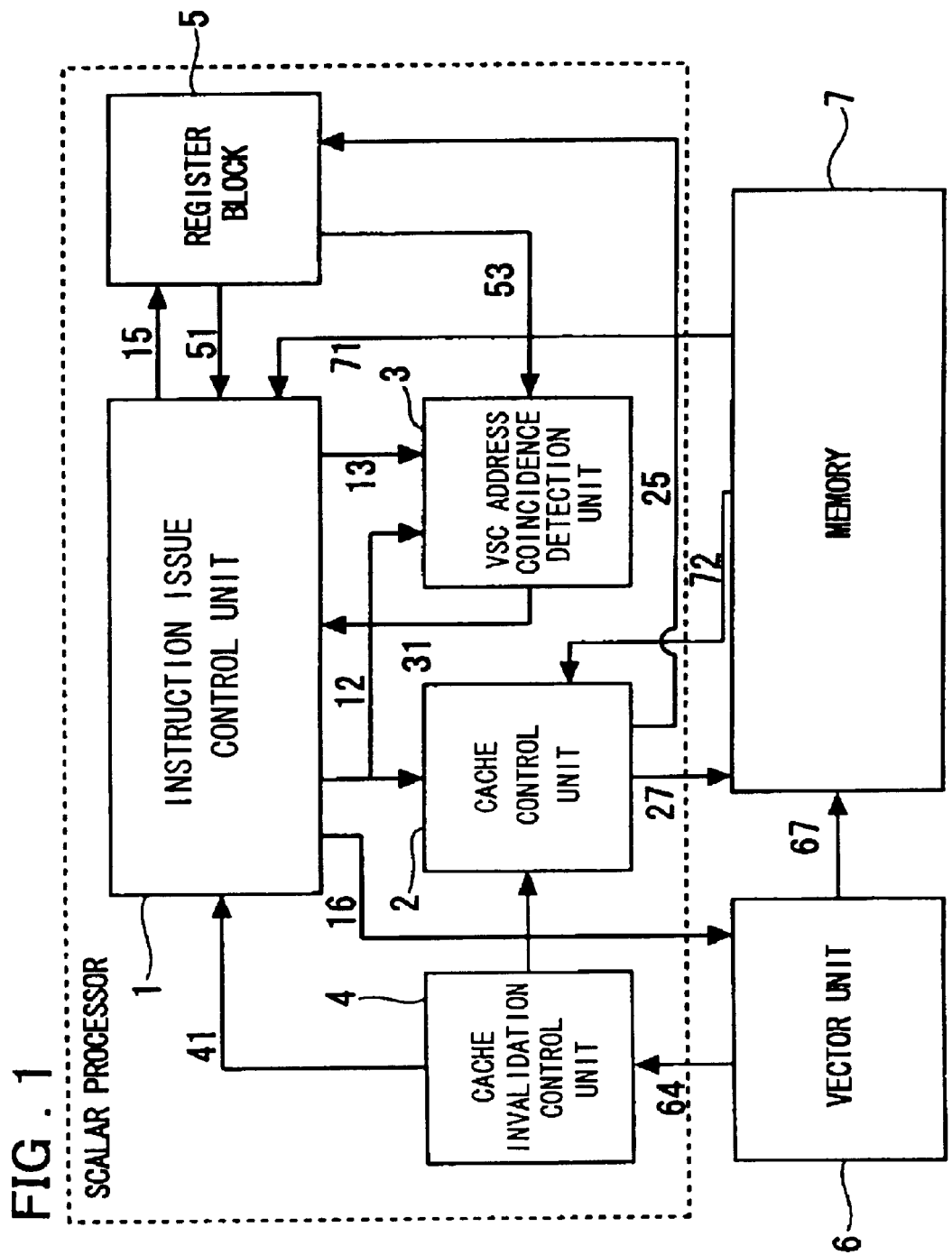
FIG. 1 is a diagram showing a configuration of an embodiment of the present invention.

An embodiment of the present invention will now be described. An embodiment of the present invention comprises a vector scatter (VSC) address coincidence detection unit that comprises a plurality of registers in which an area start address and an area end address of an area specified by an area-specified vector scatter instruction are stored; and a circuit that detects if memory address specified by the area-specified vector scatter instruction overlaps with memory address to be accessed by a memory access instruction following the area-specified vector scatter instruction, wherein an instruction issue control unit comprises a hold control circuit that holds a following memory access instruction that specifies memory address coincides with address specified by the area-specified vector scatter instruction.

More specifically, in a preferred embodiment of the present invention, a vector architecture information processing equipment comprises:

an instruction issue control unit (1) that decodes instruction data and directs an instruction operation;

a cache control unit (2) that receives an address from the instruction issue control unit (1) for controlling a cache (for example, cache update for scalar memory access instructions);

a vector unit (6) that receives an execution directive when a vector instruction is issued from the instruction issue control unit (1) and, if the vector instruction is an area-specified VSC instruction (vector scatter instruction) specifying an area start address and an area end address of a scatter area, sends vector data to be stored onto a memory (7) and, at the same time, sends a cache invalidation address;

a cache invalidation control unit (4) that receives the cache invalidation address from the vector unit (6) for invalidating the cache; and a VSC address conflict detection unit (3) that receives the area start address and the area end address specified by the area-specified VSC instruction from a register block (5) when the area-specified VSC instruction is issued from the instruction issue control unit (1), detects if an area specified by the area start and end addresses overlaps with an address area to be accessed by a memory access instruction following the area-specified VSC instruction, activates an address conflict signal if an address overlap is detected, and sends the signal to the instruction issue control unit (1).

The instruction issue control unit (1) comprises a hold control circuit (105 in FIG. 2) that holds the following memory access instruction in response to the activated address conflict signal from the VSC address conflict detection unit (3).

According to the present invention, the area-specified VSC instruction has an op-code and X, Y, and Z fields, where two registers from a register block are specified for the Z field and a start address and an end address of a scatter area are respectively specified in these two registers.

The embodiment of the present invention will be described more in detail, using an example with reference to the drawings. FIG. 1, illustrates a basic configuration of one embodiment of the present invention.

Referring to FIG. 1, a vector machine of the embodiment of the present invention comprises a scalar processor, a vector unit 6, and a memory 7. The scalar processor comprises an instruction issue control unit 1, a register block 5, a cache control unit 2, a VSC address coincidence detection unit 3, and a cache invalidation control unit 4.

The instruction issue control unit 1 decodes instruction data read from the memory 7 via a signal line 71 to request instruction execution.

The instruction issue control unit 1 sends an address to the cache control unit 2 and the VSC (vector scatter instruction) address coincidence detection unit 3 via a signal line 12, wherein the cache control unit 2 and the VSC address coincidence detection unit 3 both receiving the address, execute controlling cache access and checking VSC address coincidence respectively.

The instruction issue control unit 1 controls read form and write to the register block 5 respectively via signal lines 15 and 51.

If scalar loading from the instruction issue control unit 1 misses, the cache control unit 2 requests cache refill data via a signal line 27 and receives the data from the memory 7 via a signal line 72.

When a scalar store instruction is issued, a cache control by the cache control unit 2 is performed based on store-through algorithm, whereon in case that a cache hit occurs the cache control unit 2 rewrites cache data and always writes the data in the memory 7.

When a vector instruction is issued, the instruction issue control unit 1 sends an execution directive to the vector unit 6 via a signal line 16. At this time, in case that the vector instruction is VSC instruction, the vector unit 6 sends vector data to be written to the memory 7 via a signal line 67. In addition, the vector unit 6 sends a cache invalidation address to the cache invalidation control unit 4 via a signal line 64.

In addition, when a VSC instruction is issued, a start address and end address of the VSC instruction are sent from the register block 5 to the VSC address coincidence detection unit 3 via a signal line 53. The VSC address coincidence detection unit 3 checks if an address area specified by the instruction overlaps with that specified by a following memory access instruction to send an address coincidence signal to the instruction issue control unit 1 via a signal line 31 in case that an address overlap is detected.

Next, specifications of an area-specified VSC instruction proposed newly by the present invention will be described with reference to FIG. 3.

Figure 3:
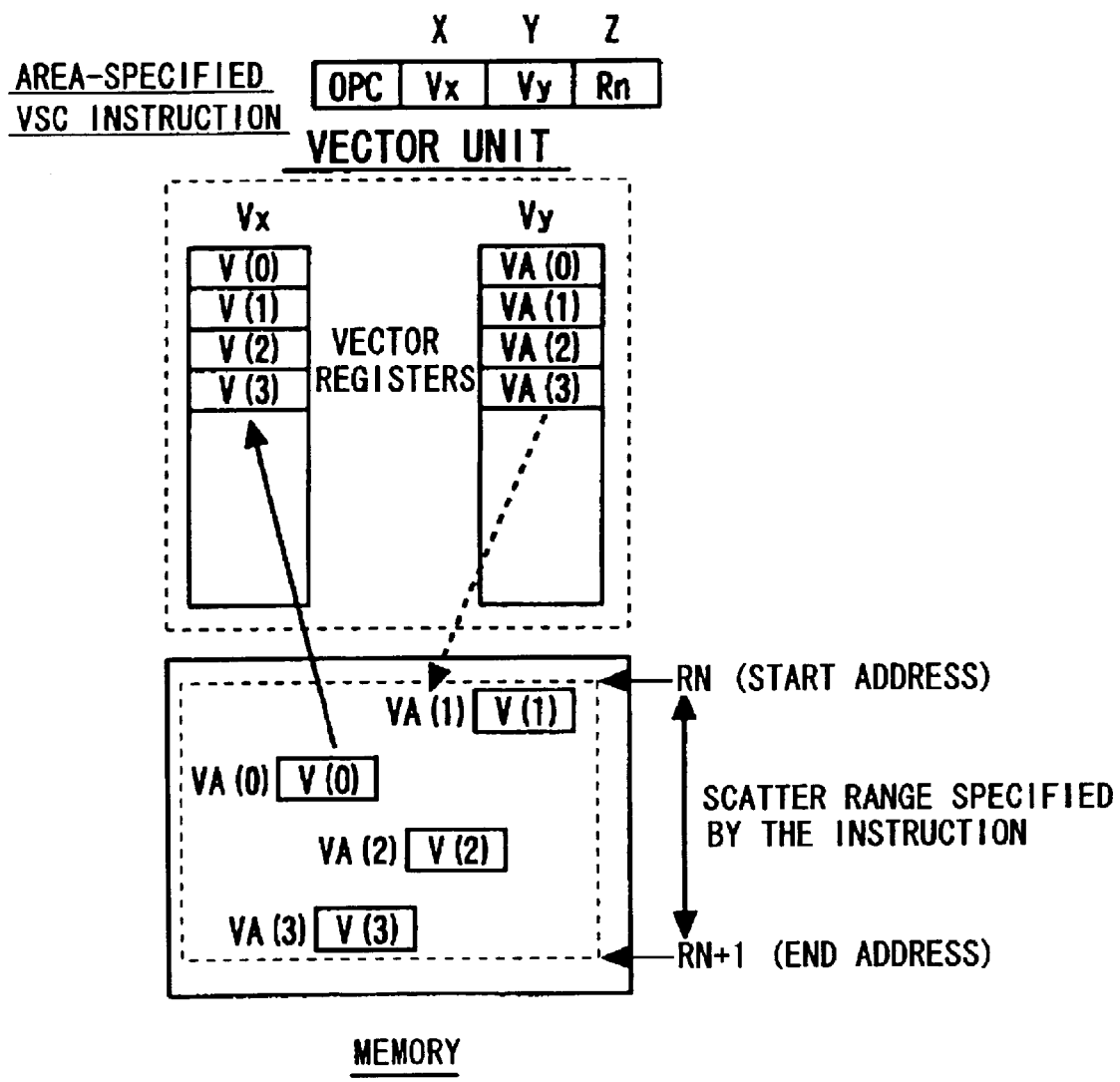
FIG. 3 is a diagram showing VSC instruction in the embodiment of the present invention.

As shown in FIG. 3, instruction field of the area-specified VSC instruction is divided into four as described above: OPC (operation code), X, Y, and Z. The area-specified VSC instruction differs from the normal VSC instruction in that the Z field specifies two registers in the register block 5, Rn and Rn+1, which respectively specify a start address and an end address of a scatter area. The X and Y fields of the VSC instruction are respectively used to specify the number of a vector register in the vector unit 6.

Figure 2:
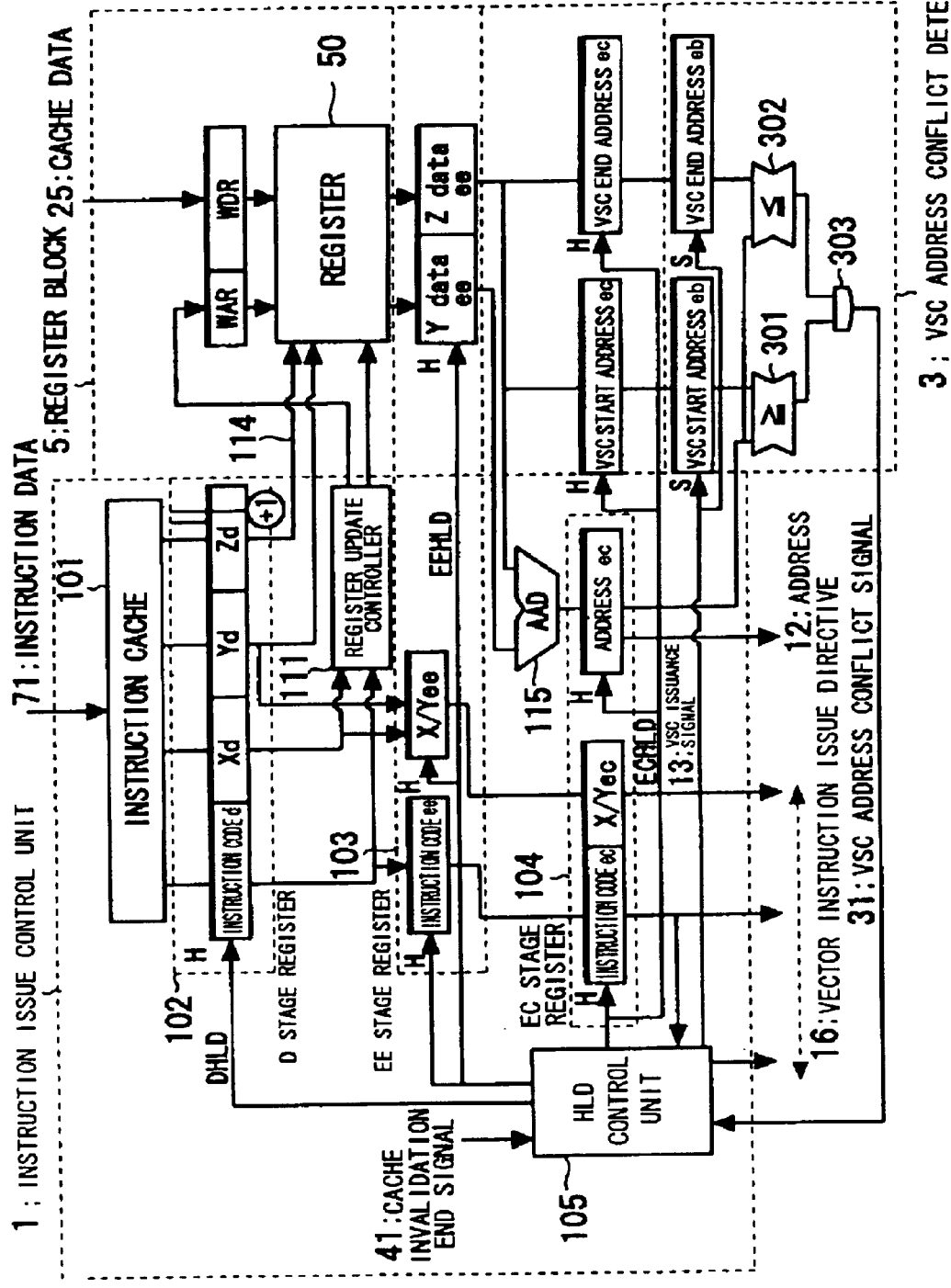
FIG. 2 is a diagram showing a configuration of an instruction issue control unit and a VSC address conflict detector in the embodiment of the present invention.

FIG. 2 illustrates a configuration of the instruction issue control unit 1, the register block 5, and the VSC address coincidence detection unit 3 of the embodiment of the present invention.

Referring to FIG. 2, instruction data supplied via the signal line 71 is once stored in an instruction cache 101 and then stored in the four fields, OPC (instruction code), X, Y and Z, of a D stage register 102.

After that, the instruction code, X field, and Y field are moved to an EE stage register 103. At the same time, the operand data is read from a register 50 of the register block 5 into registers Y data ee and Z data ee in the EE stage register 103.

In the case of LDS instruction, information in the EE stage register 103 is moved to an EC stage register 104 that follows. At the same time, an address calculated by an AAD (address adder) 115 are stored in an address ec (register) for use in accessing the cache. The output of the address ec (register) is supplied to the cache control unit 2 as the address signal 12 in FIG. 1 and to the VSC address coincidence detection unit 3.

In the case of the area-specified VSC instruction newly provided by the present invention, VSC start address and end address read via the Z data ee (latch) in the EE stage are stored, respectively, in VSC start address ec and VSC end address ec in the EC stage. Note that a signal H supplied from an HLD (hold) control unit 105 to the VSC start address ec and the VSC end address ec, is a signal used to direct the VSC start address ec and the VSC end address ec to hold data.

After that, data held in the VSC start address ec and the VSC end address ec, strobed by the a VSC issue signal 13 from the HLD control unit 105, is set in the VSC start address eb (latch) and the VSC end address eb (latch) in the EB stage.

The information is retained until the next area-specified VSC instruction is issued.

The VSC address coincidence detection unit 3 comprises a comparator 301, a comparator 302, and a logical product circuit 303. The comparator 301 compares a value of the address ec that latches an access address of a memory access instruction that follows with a value of the VSC start address eb to output an activated output signal, if the address to be accessed by the following memory access instruction is equal to or larger than the VSC start address. The comparator 302 compares a value of the address ec with a value of the VSC end address eb to outputs an activated output signal, if the address to be accessed by the following memory access instruction is equal to or smaller than the VSC end address. When both output signals supplied from the comparator 301 and the comparator 302 are active, the logical product circuit 303 provides an activated address coincidence signal 31 to the HLD control unit 105.

If the address to be accessed by the following LDS instruction that is issued immediately following the area-specified VSC instruction overlaps with the scatter area of the VSC instruction, the VSC address coincidence signal 31 is activated and sent to the HLD control unit 105. In response to this signal, the HLD control unit 105 activates (turns on) the ECHLD signal. This signal remains in an activated state (on state) until a cache invalidation end signal 41 output from the cache invalidation control unit 4 is turned on (until cache invalidation processing is completed). The following LDS instruction is held in the EC stage of the instruction issue control unit 1.

If the LDS instruction being kept waiting in the EC stage is followed by another instruction, the HLD control unit 105 turns on the EEHLD signal or the DHLD signal to keep the following instruction waiting in the EE stage or in the D stage.

A register update control unit 111 shown in FIG. 2 controls update of the register 50 in the register block 5, for example, controls an avoidance of known WAW (write after write) hazard. In case of VSC instruction, an output from the X/Y ec of the EC stage register 104 indicates a vector register number, which is supplied to the vector unit 6 via the signal line 16.

Next, operation timings of the area-specified VSC instruction and immediately following LDS instruction in the embodiment of the present invention will be described with reference to FIGS. 4 and 5. In those two examples, it is assumed that a cache hit occurs on the following LDS instruction.

Figure 4:
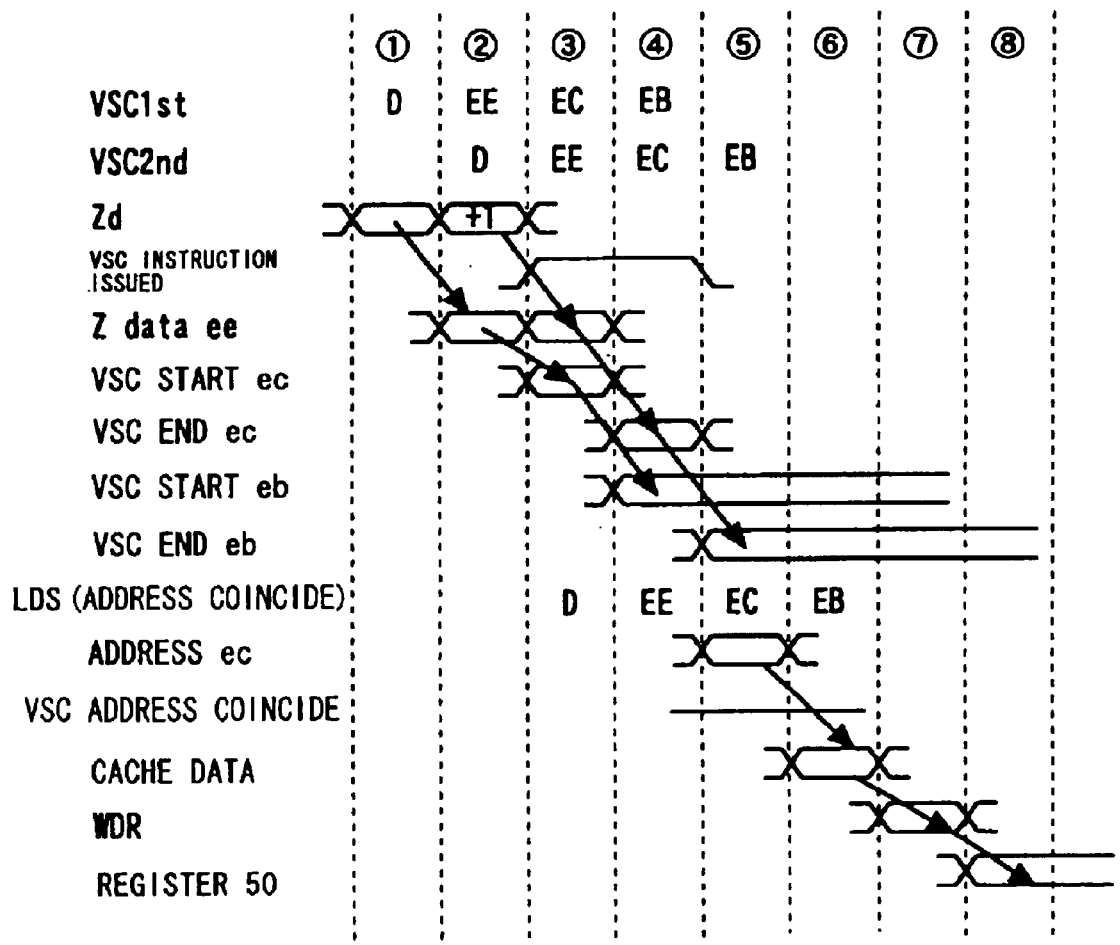
FIG. 4 is a diagram showing an operation of the embodiment of the present invention.

FIG. 4 illustrates a timing operation when an area (scatter area) specified by the area-specified VSC instruction does not overlap with an address to be accessed by the immediately following LDS instruction, that is, when an address coincidence does not occur. Note that, in FIGS. 4 and 5, DD, EE, EC, and EB correspond respectively to the D stage, EE stage, EC stage, and EB stage (VSC start address eb, VSC end address eb) in the instruction issue control unit 1 shown in FIG. 2.

The area-specified VSC instruction, which must read registers twice (Rn and Rn+1) specified in the Z operand (Zd), is divided into two (VSC1st and VSC2nd in FIG. 4) in the D stage. A increment circuit (+1) is a control circuit for reading the registers twice (Rn and Rn+1).

In timing 3 and 4, the VSC instruction issue signal 13 is asserted. At this time, the start address and the end address are stored, respectively, in the VSC start address eb and the VSC end address eb.

After that, when the LDS instruction is issued in timing 5 in the EC stage, cache data is read in timing 6 and the cache data is stored into a WDR (write data register) in register block 5 in timing 7. In timing 8, contents of the WDR are written in the register 50 to finish an execution of the LDS instruction. WAR in the register block 5 is a write address register that is used to select a register from a plurality of registers in the register 50 (register file).

Figure 5:
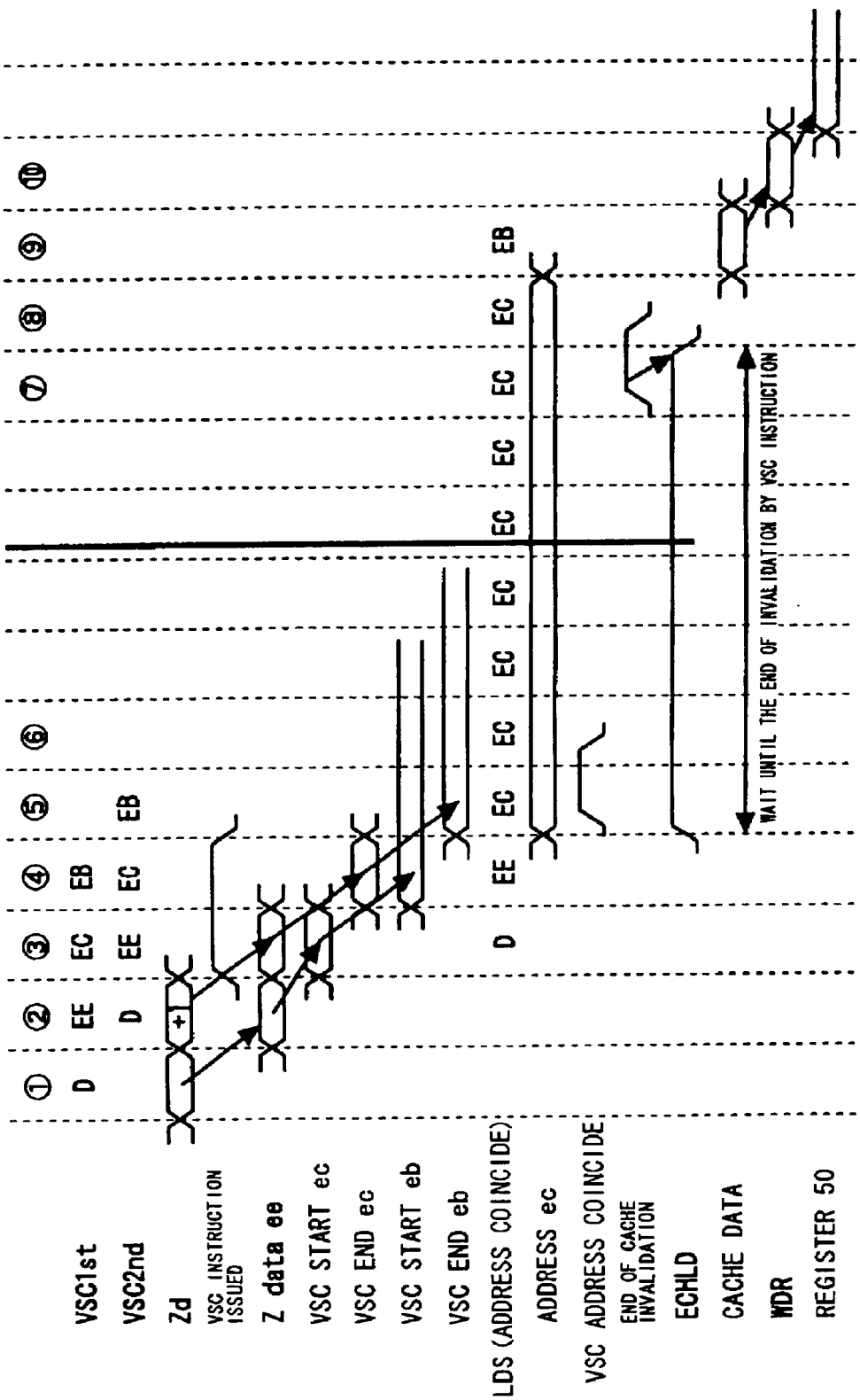
FIG. 5 is a diagram showing an operation of the embodiment of the present invention.

Next, with reference to FIG. 5, an description is done concerning an operation performed when an area specified by the VSC instruction overlaps with an address to be accessed by the following LDS instruction, that is, an operation performed when an address coincidence occurs. Difference between an operation shown in FIG. 5 and that shown in FIG. 4 begin to appear from timing 5 at which the signal indicating that VSC addresses coincidence signal is turned on in FIG. 5.

After that, the LDS instruction is held in the EC stage with the ECHLD signal being kept in a on state until the cache invalidation end signal 41 is turned on in timing 7.

Then, as in case that address does not coincide, a result of the LDS instruction is written on the register 50 via the WDR in the register block 5.

Figure 6A:
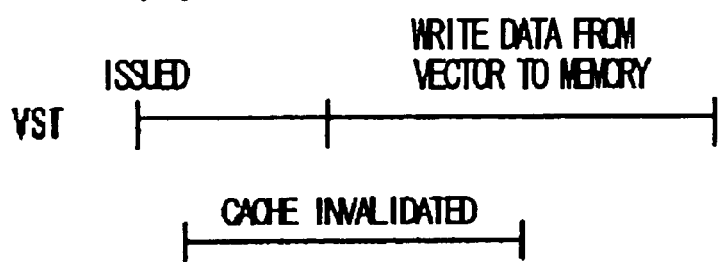
FIGS. 6(a) and 6(b) is a diagram showing a processing of VSC instruction and following LDS instruction.
Figure 6B:
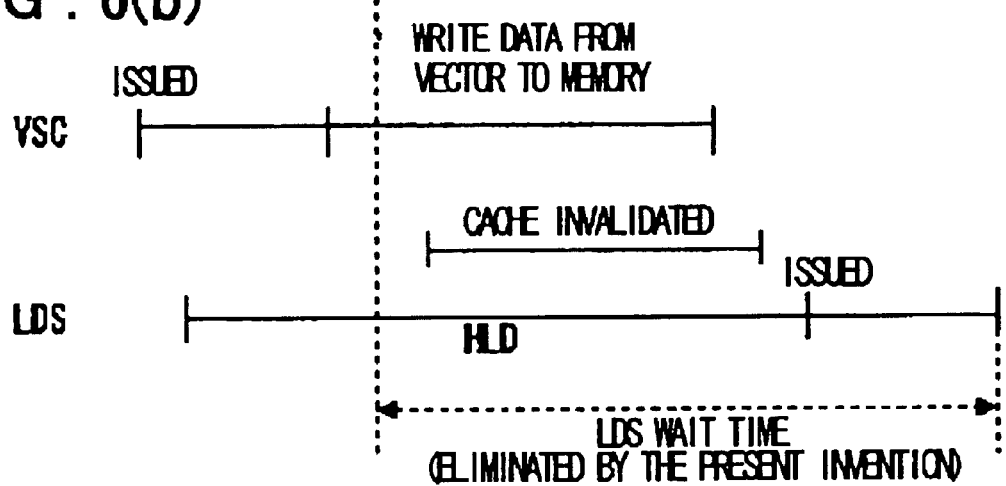
Figure 8A:
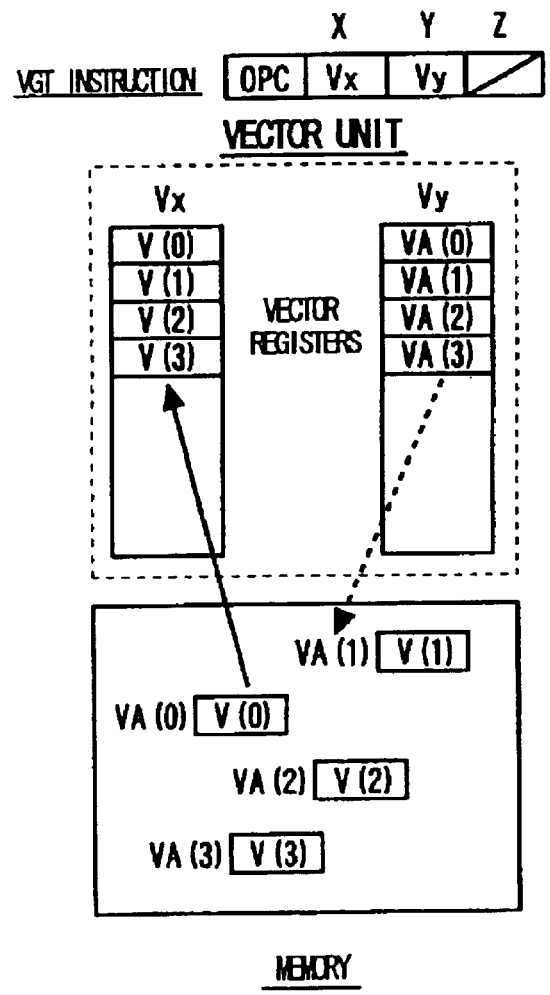
FIGS. 8(a) and 8(b) is a diagram showing conventional VGT instruction and VSC instruction.
Figure 8B:
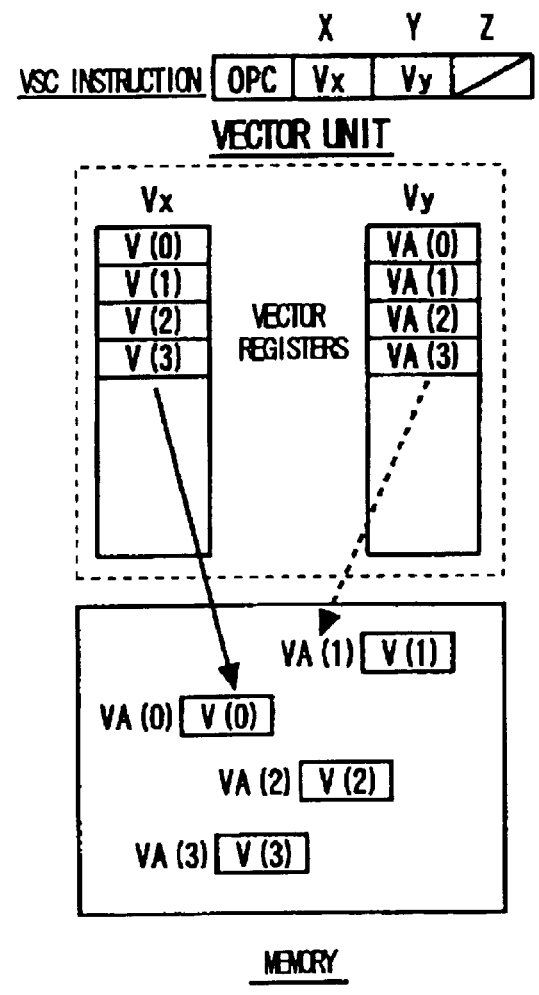

In the embodiment of the present invention, the instruction control circuit obtains information on the memory area to be accessed by the area-specified VSC instruction from a programmer (that is, from a program coded by the programmer). This allows LDS instruction that follows to be executed ahead of the area-specified VSC instruction, as a result of which significantly improves performance. A effect of the embodiment of the present invention will be described more in detail with reference to FIG. 6.

First, with a VST instruction, an area to be accessed is determined at an instruction issue time. Therefore, the cache may be invalidated immediately to allow following LDS instruction to be executed ahead of the VST instruction. If it is found that the following instruction may be executed before the preceding instruction, the LDS instruction may be executed even on a period on which cache invalidation is under way.

On the other hand, in a conventional vector machine, since memory area to be accessed by VSC instruction is not determined when the instruction is issued and in addition, is random, LDS instruction that follows cannot be executed before the VSC instruction and must be delayed until cache invalidation is completed.

With the present invention, it is possible to control LDS instruction that follows to be executed ahead of the preceding VSC instruction as if the VSC instruction was a VST instruction.

With the conventional vector data processing unit, it is necessary for the following LDS instruction, an access address of which is arbitrary one, to wait from issue time of the VSC instruction to a time of completion of cache invalidation process.

On the other hand, in accordance with the present invention this wait time is eliminated when no address coincidence occurs, as a result of which significantly improves performance of LDS instruction that is issued with a extremely high frequency.

The meritorious effects of the present invention are summarized as follows.

As described above, with the present invention, by acquiring information on areas to be accessed by an area-specified VSC (vector scatter) instruction from a program, LDS instruction that follows the area-specified VSC instruction may be executed before the area-specified VSC instruction to improve significantly processing performance. The reason is that the data processing unit according to the present invention provides means for detecting whether a address coincidence occurs between an address to be accessed by the VSC instruction, which specifies scattered areas, and an address to be accessed by the following instruction and means for holding the following memory access instruction when an address conflict occurs.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A circuit for controlling a vector scatter instruction wherein an area-specified vector scatter instruction specifying scattered areas is provided as an instruction set, comprising:
    means for detecting if an address to be accessed by the area-specified vector scatter instruction overlaps with an address to be accessed by a memory access instruction that follows the vector scatter instruction; and
    means for holding the memory access instruction that follows the vector scatter instruction if the addresses overlap.

2. The circuit as defined in claim 1 wherein the memory access instruction that follows the vector scatter instruction is held until cache invalidation is finished.

3. Vector architecture information processing equipment comprising:
    a vector scatter address coincidence detection unit including:
        a plurality of registers for storing an area start address and an area end address of an area-specified vector scatter instruction in which the area start address and the area end address are specified; and
        a circuit for checking if an address to be accessed by a memory access instruction following the area-specified vector scatter instruction is within a scatter area defined by the area start address and the area end address specified by the area-specified vector scatter instruction to output an address coincidence signal if the address to be accessed by the following memory access instruction is within the scatter area,
    wherein an instruction issue control unit comprises a hold control circuit for holding said following memory access instruction upon receipt of an address coincidence signal emitted from said vector scatter address coincidence detection unit.

4. Vector architecture information processing equipment comprising:
    an instruction issue control unit decoding instruction data to direct an instruction operation;
    a cache control unit receiving an address from said instruction issue control unit to control a cache;
    a vector unit, on receipt of an execution directive when a vector instruction is issued from said instruction issue control unit sending write vector data to a memory and sending a cache invalidation address, if the vector instruction is an area-specified vector scatter instruction specifying an area start address and an area end address of a scatter area;
    a cache invalidation control unit receiving the cache invalidation address from said vector unit to invalidate the cache; and
    a vector scatter address conflict detection unit, on receipt of the area start address and the area end address of the area-specified vector scatter instruction from a register block accessed by said instruction issue control unit when the area-specified vector scatter instruction is issued from said instruction issue control unit, detecting if an area specified by the area start address and the area end address overlaps with an address area to be accessed by a memory access instruction following the area-specified vector scatter instruction to activate an address coincidence signal for sending said signal to said instruction issue control unit if an address overlap is detected,
    wherein said instruction issue control unit comprises a hold control circuit that holds the following memory access instruction in response to the activated address conflict signal from said vector scatter address conflict detector.

5. The vector architecture information processing equipment as defined in claim 4, wherein said hold control circuit does not hold the following memory access instruction if the address coincidence signal from said vector scatter address coincidence detection unit is inactive.

6. The vector architecture information processing equipment as defined in claim 4, wherein said hold control circuit holds the following memory access instruction until a cache invalidation end notification is received from said cache invalidation control unit.

7. The vector architecture information processing equipment as defined in claim 4, wherein said vector scatter address coincidence detection unit comprises:
    a first comparator that compares the address to be accessed by the following memory access instruction with the area start address specified by the area-specified vector scatter instruction and, if the address to be accessed by the following memory access instruction is equal to or larger than the area start address, outputs an active signal;
    a second comparator that compares the address to be accessed by the following memory access instruction with the area end address specified by the area-specified vector scatter instruction and, if the address to be accessed by the following memory access instruction is equal to or smaller than the area end address, outputs an active signal; and a logical circuit that activates the address conflict signal and outputs the signal if both output signals from said first comparator and the output from said second comparator are active.

8. The vector architecture information processing equipment as defined in claim 4, wherein an operand of the area-specified vector scatter instruction comprises a predetermined field for specifying two registers in which the scatter area start address and the scatter area end address are respectively specified, said two registers being included in said register block.

9. The vector architecture information processing equipment as defined in claim 4, wherein, when at least one instruction follows said following memory access instruction, said hold control circuit also holds said one instruction in each corresponding stage in response to the activated address coincidence signal from said vector scatter address coincidence detection unit.

10. The vector architecture information processing equipment as defined in claim 4, wherein an operand of the area-specified vector scatter (VSC) instruction comprises X, Y, and Z fields for specifying respectively X register, Y register, and Rn register of two registers Rn and Rn+1 in which the scatter area start address and the scatter area end address are respectively specified, said two registers being included in said register block, said instruction issue control unit comprising;

an instruction cache for storing instruction data read from a memory;

a first stage register for storing an operation code and operand fields of an instruction sent from said instruction cache;

an increment circuit for incrementing a register number for specifying a two consecutive registers Rn and Rn+1 in the register block, in which the scatter area start address and the scatter area end address are respectively specified;

a register update control unit for controlling update of registers in the register block;

a second stage register for storing operation code, X field and Y field of the operand read moved the first stage register;

a third stage register to which information in the second stage register is moved for outputting a vector instruction issue directive information to the vector unit wherein in case of the VSC instruction, the output from the third stage register indicates a vector register number, said vector register number being supplied to the vector unit; and a third stage address register for storing an address in case of scalar load (LDS) instruction for use in accessing the cache;

Y data and Z data registers for storing operand data read from the register located in the second stage;

said address coincidence detection unit comprises:

a VSC start address latch and a VSC end address latch located in said third stage, in which a VSC start address and a VSC end address read via the Y and Z data registers in the second stage are stored, respectively, wherein the VSC start address latch and the VSC end address latch on receipt of a hold signal supplied from said hold control circuit to hold the VSC start address and the VSC end address;

a VSC start address latch and the VSC end address latch located in a fourth stage wherein data held in the VSC start address latch and the VSC end address latch, strobed by a VSC issue signal from the hold control unit, is set and retained until a next area-specified VSC instruction is issued, a first comparator that receives outputs of said third stage address register and said fourth stage VSC start address latch;

a second comparator that receives outputs of said third stage address register and said fourth stage VSC end address latch;

a logic circuit receiving comparison results of said first and second comparators to output an address coincidence signal to said hold control unit, said hold control unit, upon receipt of the address coincidence signal outputting a hold signals respectively to said first stage register, said second stage register, said third stage register, and said third stage address register, wherein in case that an address to be accessed by a LDS instruction that is issued immediately following the area-specified VSC instruction does not overlap with the scatter area of the VSC instruction, the address coincidence signal is inactivated and sent to said hold control unit, said hold control unit not activating the hold signal, whereas in case that an address to be accessed by the following LDS instruction overlaps with the scatter area of the VSC instruction, the address coincidence signal is activated and sent to said hold control unit, said hold control unit, by activating the hold signal to said third stage VSC start address latch and a VSC end address latch, said hold signal being kept in an activated state until a cache invalidation end signal output from the cache invalidation control unit indicates that the cache invalidation processing is completed, while the following LDS instruction being held in the third stage of the instruction issue control unit.

* * * * *